(No Model.)
H. H. HIPWELL.
GUARD FOR INCANDESCENT LAMPS.
No. 459,749. Patented Sept. 22, 1891.
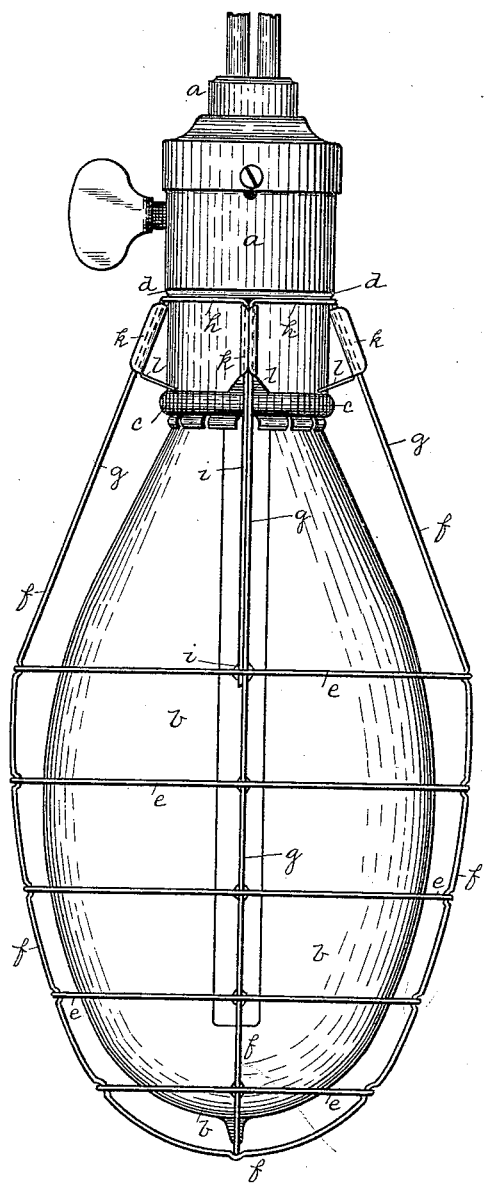
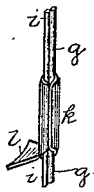
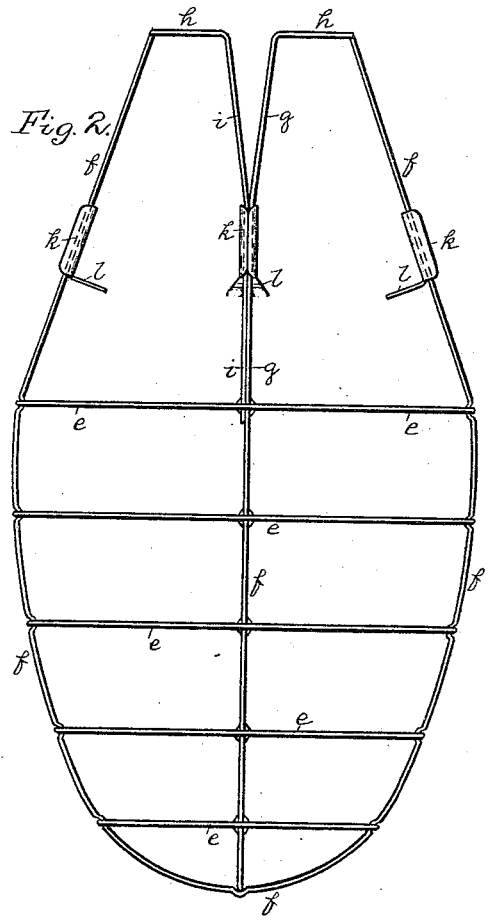
Witnesses:
Inventor:
Harry H. Hipwell
By James D. Ray
Attorney

UNITED STATES PATENT OFFICE.

HARRY H. HIPWELL, OF ALLEGHENY, PENNSYLVANIA.

GUARD FOR INCANDESCENT LAMPS.

SPECIFICATION forming part of Letters Patent No. 459,749, dated September 22, 1891.

Application filed October 20, 1890. Serial No. 368,648. (No model.)

*To all whom it may concern:*

Be it known that I, HARRY H. HIPWELL, a resident of Allegheny city, in the county of Allegheny and State of Pennsylvania, have invented a new and useful Improvement in Guards for Incandescent Lamps; and I do hereby declare the following to be a full, clear, and exact description thereof.

My invention relates to the cages for protecting the bulbs of incandescent lamps, these cages being employed around the bulb a sufficient distance from the same to prevent injury to the bulb in case the cage receives a blow from any tool in the hands of workmen or is swung in any way against any hard object which, if it came in contact with the bulb, would cause the fracture of the same. These cages have heretofore been formed of wire and have been so constructed as to either open and close around the bulb on hinges provided in certain parts of the cage or else have been provided with arms or loops which extend down from the body of the cage and were drawn together around the bulb-holder, so as to secure the cage to the bulb-holder.

As heretofore constructed, however, in order to obtain the necessary stiffness of arms or loops to be clamped around the bulb-holder and hold the cage in the proper position to protect the bulb it has been found necessary to make the loops or the ribs of the cage of heavy wire to obtain sufficient stiffness at the point of its connection with the bulb-holder to hold the cage in the proper position relative to the bulb.

My present invention has for its object the overcoming of this difficulty by providing a means for supporting and bracing the cage without the necessity of the employment of wire of great strength, so enabling me to reduce the cost of the cage to a minimum.

To this end my invention consists, generally stated, in combining with the incandescent lamp and its bulb-holder a cage fitting around the same and having a series of arms or loops extending back to the bulb-holder and a series of sleeves fitting around such arms or loops and sliding thereon, such sleeves having inwardly-extending lugs adapted to engage with the bulb-holder and brace the inner ends of the arms of the cage by the pressure of such lugs upon the bulb-holder, so giving the necessary stiffness to the cage, even though it be formed of light wire, and enabling me to provide a cage simple in construction and yet efficient for the purpose.

To enable others skilled in the art to make and use my invention, I will describe the same more fully, referring to the accompanying drawings, in which—

Figure 1 is a side view of an incandescent lamp having my improved cage applied thereto. Fig. 2 is a like view of the cage when opened and before it is applied to the lamp. Fig. 3 is a small detail perspective showing the construction of the sleeve.

Like letters of reference indicate like parts in each.

The bulb-holder $a$ and the bulb $b$ are of the ordinary construction in incandescent lamps, the bulb-holder, as is usual in such lamps, having just above the bulb the annular ridge $c$ and slightly higher up thereon the annular shoulder $d$. The cage is formed of wire rings $e$ and wire ribs $f$, the inner or upper ends of such wire ribs forming the arms which engage with the bulb-holder of the lamp. The preferred construction of these arms is illustrated in the drawings, each arm $g$ extending up to the bulb-holder being then bent to conform to the surface of the bulb-holder and extend about one-fourth around the same, so forming the seat $h$, and being then carried down to the top ring, as at $i$, close to the adjoining loop, rib, or arm $g$. This forms a series of loops, which in their normal position open out away from the bulb-holder, as shown in Fig. 2. Fitting around the two adjacent wires $g$ $i$ of the loops are the sleeves $k$, these sleeves being adapted to slide upon the wires and resting at the bases of the loops when the loops are opened out to pass over the bulb, and as they slide upwardly along the wires acting to draw them together and contract them around the bulb-holder, as shown, the sleeves $k$ sliding outwardly along the wires until they reach the ends of the loops, so contracting the seats $h$ around the bulb-holder. Each sleeve $k$ is provided with a lug $l$, which extends inwardly from the same, and when the sleeves reach the upper ends of the loops these lugs $l$ press upon the body of the bulb-holder, the inner edges of the lugs thus forming braces or supports for the cage upon the bulb-holder a short distance below the point where the arms take hold upon the bulb-holder, the lugs therefore bracing the cage in the desired position around the bulb and imparting all the necessary strength and stiffness thereto, even where the cage is formed of exceedingly light wire. The several lugs, when brought to their seats, will pass over the annular ridge c at the base of the bulb-holder, and said ridge will act to hold them in proper place thereon, preventing their slipping down along the wires.

Practical use of a large number of these cages for incandescent lamps has proven them efficient for the purpose, while as they are properly braced and held the proper distance from the lamp itself, any blow upon the cage will not be sufficient to press it over against the lamp or bulb, so that the lamp is properly protected thereby. At the same time the cage can be made at comparatively slight cost, as only very light wire is required for its manufacture.

No claim is made herein for the broad construction of guard shown and claimed in application filed by me November 13, 1889, Serial No. 330,224, covering, generally stated, the cage having one or more ribs and longitudinal ribs, and a series of expansible arms extending up from the ring and engaging with the bulb-holder.

What I claim as my invention, and desire to secure by Letters Patent, is—

1. A guard-cage for incandescent lamps having a series of arms extending up from the cage and sleeves slipping over such arms and adapted to contract the same around the bulb and provided with lugs at their lower ends to bear upon the bulb-holder, substantially as and for the purposes set forth.

2. A wire-guard cage for incandescent lamps fitting around the bulb and having a series of arms extending up from the cage and sleeves slipping over said arms and provided with lugs at the lower end thereof, in combination with a bulb-holder having an annular rib thereon with which said lugs engage, substantially as and for the purposes set forth.

In testimony whereof I, the said HARRY H. HIPWELL, have hereunto set my hand.

HARRY H. HIPWELL.

Witnesses:
JAMES I. KAY,
J. N. COOKE.